Patented Aug. 14, 1945

2,382,086

UNITED STATES PATENT OFFICE 2,382,086

SYNTHESIS OF ETHERS OF VITAMIN A

Nicholas A. Milas, Belmont, Mass., assignor to Research Corporation, New York, N. Y., a corporation of New York No Drawing. Application January 31, 1945, Serial No. 575,550

11 Claims. (Cl. 260—611)

An object of the present invention is to provide a new method for the synthesis of ethers of vitamin A. This application is a continuation-in-part of my application Serial Number 409,314, filed September 2, 1941. In said application I disclosed several methods for the synthesis of ethers of vitamin A based upon the concept of starting with the aldehyde compound

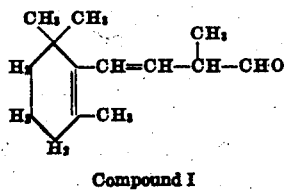

Compound I and the ketone compound

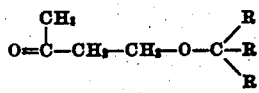

Compound II in which R stands for hydrogen or a hydrocarbon group. The group

may be any alkyl group such as methyl, ethyl, etc., including substituted alkyls such as triphenyl methyl in which the R's are phenyl groups. According to said application, the carbinol of one of said compounds is formed, united with the other compound via the Grignard or metallo derivative thereof, the product hydrogenated to convert the acetylene bond into an ethylene bond and the two components dehydrated either before or after their combination.

The present application is concerned with the method in which the carbinol of Compound I is dehydrated before being combined with Compound II.

The principal steps involved in this process, starting with Compounds I and II are the following.

Compound I is converted into the corresponding acetylene carbinol compound which is dehydrated and the dehydrated product converted to the corresponding Grignard or metallo derivative (metal of the first group of the periodic system), the latter is then reacted with Compound II to form Compound VI which is converted to the vitamin A ether by two routes: (1) it is partially and selectively hydrogenated (acetylene—olefin) and the carbinol so formed dehydrated or dehydrohalogenated to the vitamin A ether; (2) it is directly dehydrated to the polyen-yne (Compound VII) which is then partially and selectively hydrogenated to the vitamin A ether. The following equations illustrate the process.

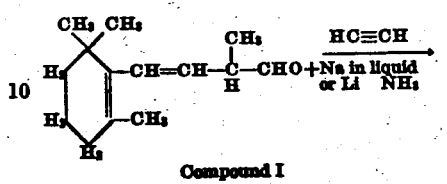

Compound I

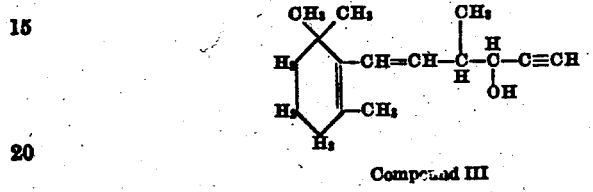

Compound III

Compound III dehydrated
p-toluene sulfonic acid
or AlPO₃ (at low pressure and 270°–290° C.)

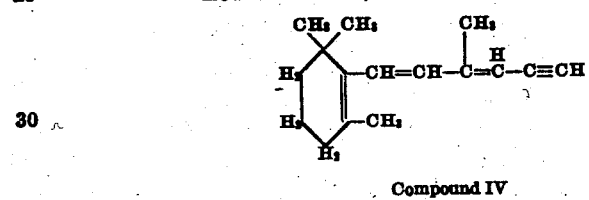

Compound IV

Grignard reagent
Compound IV or alkali metal in liquid NH₃

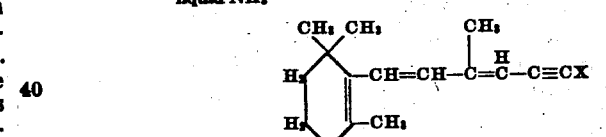

Compound V in which X stands for the Grignard group or a metal of the first group Compound V+Compound II ⟶

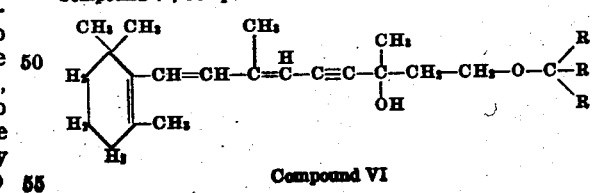

Compound VI

Compound VI + dehydration ⟶

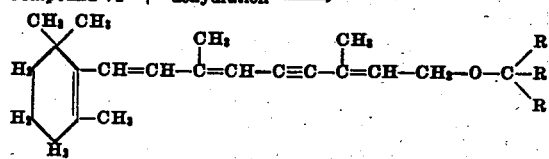

Compound VII

Compound VI + hydrogenation ⟶

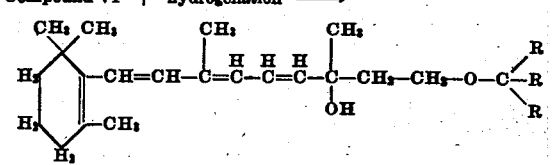

Compound VIII

Compound VII + hydrogenation
of
Compound VIII + dehydration ⟶

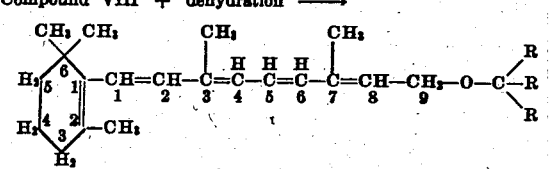

ether of vitamin A

In the following specific examples of procedures for carrying out the reactions outlined above, the preparation of the ethyl ether of vitamin A will be used as illustrative and the compounds will be referred to by the numbers used in the above equations with the additional designation "ethyl."

*Preparation of Compound III, i. e. the acetylene carbinol of Compound I*

Compound I is condensed with sodium or lithium acetylides in a mixture of anhydrous ether and liquid ammonia at temperatures between —55° and —70° C. After the reaction is over, the ammonia is removed and the product treated with a dilute solution of tartaric acid, although aqueous solutions of ammonium sulfate, ammonium chloride or other organic acids may also be used. The resulting Compound III is extracted from this mixture in an impure state and may be purified either by high vacuum distillation in an inert atmosphere or by preparing its phthalic acid ester by reacting the mixture with phthalic anhydride in pyridine solution. The phthalic acid ester is subsequently saponified to obtain the pure acetylene carbinol, Compound III.

Compound III may be prepared also by the interaction of the mono-Grignard of acetylene (HC≡CMgX) and the aldehyde of Compound I.

*Dehydration of Compound III to Compound IV*

Compound III may be dehydrated by distilling under high vacuum with small amounts of naphthalene sulfonic acid, p-toluene sulfonic acid or a mixture of these acids with succinic anhydride yielding Compound IV directly.

A preferred method of dehydrating Compound III without appreciable decomposition is by passing it upwards at low pressures (0.1–1 mm.) through a tube packed with aluminum phosphate deposited on pumice and maintained at temperatures between 270° and 290° C. The lower boiling polyvinyl acetylene IV is condensed at the top of the tube and further purified by fractional distillation.

However, better yields of Compound IV are obtained by preparing the bromide or chloride of Compound III, for example by reacting it with PBr₃ in pyridine, and subsequently removing hydrogen bromide with alcoholic potash.

*Preparation of the Grignard (Compound V) of Compound IV*

To one mole-equivalent of ethyl magnesium bromide in anhydrous ether add slowly with stirring at 0° and in an atmosphere of N₂ one mole-equivalent of Compound IV, i. e. the dehydrated acetylene carbinol of aldehyde Compound I. Allow the mixture to warm up to room temperature and reflux it gently for about 10 hours.

*Reacting Compound V with Compound II ethyl to produce Compound VI ethyl*

The reaction mixture of the foregoing operation containing Compound V, i. e. the Grignard of the dehydrated acetylene carbinol of Compound I is cooled to 0° C. and one mole-equivalent of Compound II ethyl added in an atmosphere of N₂ and the mixture refluxed for about 24 hours. The mixture is then cooled and poured into a mixture of ammonium sulfate and ice and the reaction product, Compound VI ethyl, extracted with ether from which it is recovered and purified, by removing the unconverted acetylene with alcoholic ammoniacal silver nitrate solution.

Compound VI ethyl may be hydrogenated either chemically or catalytically yielding predominantly the trans or cis isomer respectively of Compound VIII which latter is then dehydrated to the trans or cis isomer respectively of the ether of vitamin A, or Compound VI may be dehydrated to Compound VII which then may be reduced either chemically or catalytically to yield predominantly the trans or cis isomer respectively of the ether of vitamin A.

*Dehydration of Compound VI-ethyl to Compound VII-ethyl.*—To 250 cc. of pure toluene was added 0.3 g. of p-toluene sulfonic acid monohydrate. To dehydrate the p-toluene sulfonic acid, 100 cc. of toluene was distilled carrying the water with it. The solution was then cooled in nitrogen and to it was added 9.5 g. of Compound VI in 250 cc. of toluene and about 150 cc. of toluene was distilled in nitrogen. The mixture was then cooled to room temperature and shaken with 150 cc. of methanol containing 3 g. of potassium hydroxide. Water was then added to separate the alcohol from the toluene layer, the latter removed, dried and the toluene removed under reduced pressure. The residue was further purified first from olefin-free petroleum ether then dissolved in 90% methanol and extracted with petroleum ether and finally fractionated successively in 10° interval from 0° to —78° using anhydrous methanol as solvent.

*Conversion of Compound VII-ethyl into vitamin A ethyl ether.*—It is well known that in the partial hydrogenation of an acetylene bond attached to two different groups, as in the case of compound VII, to give the corresponding olefin, the latter may be present in two different isomers, cis and trans. The proportion of these two isomers depends upon the method used to add the two hydrogen atoms to the acetylene bond. For instance, if selective catalytic hydrogenation is employed the predominant isomer present is cis, whereas if a chemical method (e. g. a metal or its amalgam of the first and second groups of the periodic system + alcohol, liquid ammonia or any substance which gives "nascent" hydrogen on reacting with the metal, zinc aluminum or their amalgams or certain alloys of these metals are allowed to react with inorganic or organic bases or organic acids to give "nascent" hydrogen) is used the predominant isomer present is trans. Examples of each of these two methods are given in the following disclosures:

(1) *Catalytic method.*—To 50 cc. of absolute alcohol was added 0.3398 g. of 10% palladium hydroxide on calcium carbonate and the palladium hydroxide reduced with hydrogen gas into palladium black. To this mixture was then added 1.6505 g. of Compound VII in 25 cc. of absolute alcohol and hydrogen gas was introduced until 127 cc. (N. T. P.) was absorbed. The reaction was stopped and the vitamin A ether recovered.

(2) *Chemical method.*—Compound VII (2.031 g.) dissolved in 26 cc. of anhydrous methanol was added to 100 cc. of 90% ethanol containing 6 g. of solid potassium hydroxide and to this mixture was added 0.52 g. of zinc dust. Gentle stirring was provided by nitrogen bubbling through the mixture for seventeen hours. The reaction mixture was then diluted with water and extracted with olefin-free petroleum ether, the latter dried, filtered and the petroleum ether removed.

This partial reduction was also accomplished by using an organic acid (acetic acid) in alcoholic solution with zinc dust instead of alkali.

*Conversion of Compound VI-ethyl into 5-cis-Compound VIII-ethyl (catalytic method).*—To 100 cc. of absolute alcohol was added about 0.6 g. of 10% palladium hydroxide on calcium carbonate and the palladium hydroxide reduced with hydrogen gas into palladium black. To this mixture was then added 3.3 g. of Compound VI-ethyl in 50 cc. of absolute alcohol and hydrogen gas introduced until about 225 cc. (N. T. P.) was absorbed.

5-cis-Compound VIII-ethyl was dehydrated to the 5-cis vitamin A ethyl ether in boiling toluene with small amounts (2% of the weight of Compound VIII-ethyl) of p-toluene sulfonic acid.

In the conversion of 5-cis-Compound VIII-ethyl into the 5-cis vitamin A ethyl ether, one may use the following procedure: Dissolve 0.2 of a mole of 5-cis-Compound VIII-ethyl in about 150 cc. of anhydrous toluene and add to the mixture 30 g. of anhydrous pyridine. Cool the mixture to between 0° and —5° C. and add with rapid stirring 0.42 of a mole of phosphorus tribromide. Allow the mixture to warm slowly to room temperature and increase the temperature to about 50° C. and keep it there for one to two hours. The mixture will become brown. Cool and add to it 300 cc. of 95% alcohol containing 0.45 of a mole of solid potassium hydroxide. The mixture will heat up but do not allow the temperature to exceed the boiling point of the alcohol. Keep it at this temperature with nitrogen passing through the solution for two to three hours, then remove most of the alcohol under reduced pressure. Cool and dilute the mixture with about four volumes of cold deoxygenated water and separate the resulting layers. Extract the aqueous layer once or twice with petroleum ether and combine non-aqueous extracts. Extract the non-aqueous solutions with 5% aqueous tartaric acid solution. Finally, dry the non-aqueous solutions, remove the solvents under reduced pressure and subject the residue to a high vacuum at not higher than 60°–80° C. (bath temperature) in order to remove volatile constituents.

*Conversion of Compound VI-ethyl into 5-trans-compound VIII-ethyl (chemical method).*—Compound VI-ethyl (3.3 g.) dissolved in about 25 cc. of anhydrous methanol was added to 100 cc. of 90% ethanol containing 5 g. of solid potassium hydroxide and to this mixture was added 0.8 g. of zinc dust. Gentle stirring was provided by nitrogen bubbling through the mixture for about 20 hours. The reaction mixture was then diluted with water and extracted with olefin-free petroleum ether, the latter dried and the petroleum ether removed. The residue was 5-trans Compound VIII-ethyl.

*Conversion of 5-trans Compound VIII-ethyl into 5-trans vitamin A ethyl ether.*—This conversion was accomplished either by dehydration using p-toluene sulfonic acid in boiling toluene, or by the dehydrobromination method described previously.

Compound II ethyl used in the preparation of the ethyl ether of vitamin A may be prepared as described in my application Serial No. 409,314.

Compound I may be prepared as described in my application Serial No. 353,775, filed August 22, 1940.

For the preparation of the trityl ether of vitamin A one starts with Compound II phenyl, that is, Compound II in which the three R's stand for phenyl groups, which may be prepared as described in my application Serial No. 409,314 instead of Compound II ethyl as described above.

Instead of forming the Grignard of Compound IV as described above and reacting it with Compound II to produce Compound VI ethyl, the same result may be obtained by forming the metallo (metal of the first group of the periodic system) compound of Compound IV and reacting it with Compound II. Thus, an alkali metal such as lithium is dissolved in liquid ammonia and an equivalent quantity of Compound IV is added. To the resulting mixture, at a temperature between —60° and —70° an equivalent amount of Compound II is added with rapid stirring. After stirring for 24 hours, the ammonia is removed and the residue treated with a cold aqueous mixture of ammonium sulfate or chloride. The product Compound VI is then extracted with ether and purified as in other cases.

The final product i. e. the vitamin A ether prepared by any of the methods described above may be purified either by high vacuum distillation ($10^{-4}$ to $10^{-5}$ mm. Hg) or fractional crystallization at low temperature or both.

A preferred method of making the ethers of β-hydroxy butanone-2 is as follows:

*Addition of methanol to methyl vinyl ketone.*—A mixture of 3 g. of red mercuric oxide, 2 cc. of boron tri-fluoride-etherate and 2 cc. of anhydrous methanol was placed in a 3-necked flask equipped with a condenser, a dropping funnel and a mercury sealed stirrer. All inlets were protected with calcium chloride tubes. The mixture was then stirred and heated on a steam-bath until a grayish white paste was formed. The catalyst was then allowed to cool to room temperature and to it was added 30 g. of anhydrous methanol. To this mixture was then added dropwise, in the course of forty minutes with stirring, a mixture of 128 g. of methyl vinyl ketone and 66 g. of methanol. The mixture was refluxed on the steam-bath for one hour, then allowed to stand at room temperature for 24 hours.

Finally, the mixture was neutralized with solid anhydrous potassium carbonate, filtered, and fractionated. The fraction boiling at 100° to 135° was collected and allowed to stand until the colloidal mercury precipitated and was removed. The crude product was then fractionated and the fraction boiling at 142°–146° (yield, 63 g.) collected and analyzed.

Anal. calcd. for $C_5H_{10}O_2$: C, 58.82; H, 9.8. Found: C, 58.73; H, 9.86. Zerewitinoff, 0; $n_D^{23}$, 1.4045.

I claim:

1. As a new product a compound of the formula

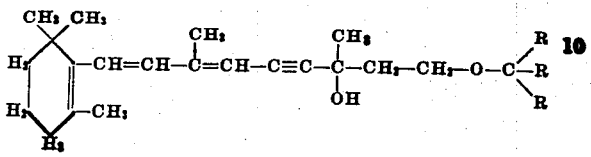

in which R is a member of the group consisting of hydrogen and hydrocarbon groups.

2. Product as defined in claim 1 in which each R stands for a phenyl group.

3. Product as defined in claim 1 in which two R's stand for hydrogen and one R stands for a methyl group.

4. As a new product a compound of the formula

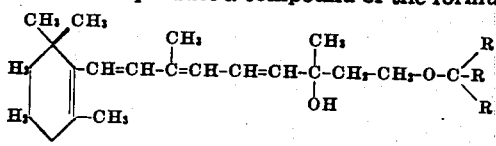

in which R is a member of the group consisting of hydrogen and hydrocarbon groups.

5. Process for the synthesis of vitamin A ethers which comprises reacting a compound of the formula

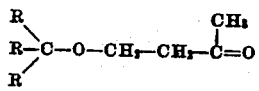

in which R stands for a member of the group consisting of hydrogen and hydrocarbon groups, with a compound of the formula

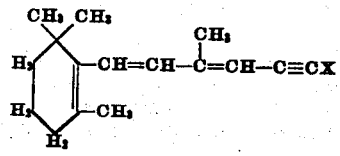

in which X stands for a member of the group consisting of the Grignard group and metals of the first group of the periodic system.

6. Process as defined in claim 5 in which X is a Grignard group.

7. Process as defined in claim 5 in which X is a metal of the first group of the periodic system.

8. Process as defined in claim 5 in which the product of the reaction is hydrogenated chemically.

9. Process as defined in claim 5 in which the product of the reaction is hydrogenated catalytically.

10. Process as defined in claim 5 in which the product of the reaction is dehydrated and then hydrogenated chemically.

11. Process as defined in claim 5 in which the product of the reaction is dehydrated and then hydrogenated catalytically.

NICHOLAS A. MILAS.